United States Patent

[11] 3,594,760

| [72] | Inventor | Floyd H. Haker<br>6546 Linden Lane, Dallas, Tex. 75230 |
|---|---|---|
| [21] | Appl. No. | 795,308 |
| [22] | Filed | Jan. 30, 1969 |
| [45] | Patented | July 20, 1971 |

[54] ADVERTISING DISPLAY DEVICE
11 Claims, 3 Drawing Figs.

[52] U.S. Cl. ................................................. 340/325,
40/52 A, 40/132 R, 340/272, 340/326, 340/327,
340/334, 340/338
[51] Int. Cl. ..................................................G09f 13/04
[50] Field of Search.......................................... 340/334,
338, 326, 327, 325, 272, 221; 40/132, 52 A

[56] References Cited
UNITED STATES PATENTS

| 2,152,296 | 3/1939 | Weis et al. | 340/221 X |
| 1,915,167 | 6/1933 | Salsbury | 340/272 UX |
| 2,626,389 | 1/1953 | Ellison | 340/325 |
| 2,942,249 | 6/1960 | Paull | 340/327 X |
| 3,171,114 | 2/1965 | Butler et al. | 340/225 X |

*Primary Examiner*—John W. Caldwell
*Assistant Examiner*—David L. Trafton
*Attorney*—Giles C. Clegg, Jr.

ABSTRACT: An advertising display device comprising a display unit having a plurality of panels, indicia on each of the panels for indicating a certain product or service when the panel is energized, alarm means responsive to the presence of a prospective customer, and control means responsive to operation of the alarm means for energizing the panels in a selectable sequence as a function of the number of operations of the alarm means.

INVENTOR
FLOYD H. HAKER

ATTORNEY

INVENTOR
FLOYD H. HAKER

ATTORNEY

ADVERTISING DISPLAY DEVICE

The present invention relates to advertising devices and more particularly to an advertising device of the type for advertising selected services and products and indicating that the particular customer is to receive a gift of one of the advertised services and products.

An important portion of the advertising in many retail businesses, particularly in service station establishments is devoted to the giving to customers of bonuses of either cash or prizes. Trading stamps account for a significant portion of this type of advertisement. The owner will purchase from a stamp company trading stamps which are given to the customers in accordance with the amount of the customers' purchases. The customers can then redeem such stamps for selected gifts. The principle disadvantage of the stamp-type promotion is that it is very expensive to the owner. Also, gifts are obtained only after saving the stamps over a period of time to accumulate the required number, which then must be placed in books.

Many types of games have been devised. Although the names and details of the games may vary, they are basically similar in that each time a person enters an establishment he is entitled to receive a stamp or other token. When a specified group of such stamps or tokens have been collected, the holder thereof becomes entitled to receive a prize. However, in general, the number of prizes awarded in such games at a particular retail establishment is small, and most customers never receive a prize or know of anyone that does.

Devices have been proposed that award prizes to customers or potential customers entering a retail establishment. However, such devices generally operated on a random principle and the cost of the advertising program could not be accurately ascertained.

The present invention provides an improved advertising display device in which selected services and/or products are continuously advertised by displaying the services and/or products on a display unit having panels which are energized in a selected pattern. There is associated with the display unit an alarm responsive to the presence of a prospective customer and control means responsive to operation of the alarm means for energizing the panels in a selectable sequence to indicate the winner of a prize as a function of the number of operations of the alarm means. Indicia on the panels representative of the prizes can be changed in order that the prizes can be varied over a period of time. Further, the control means can be adjusted to control the frequency at which particular prizes are awarded.

Many objects of the invention defined in the claims will become apparent to those skilled in the art as a detailed description of the preferred embodiment of the invention unfolds in conjunction with the appended drawings wherein like reference numerals denote like parts and in which:

Figure 1:
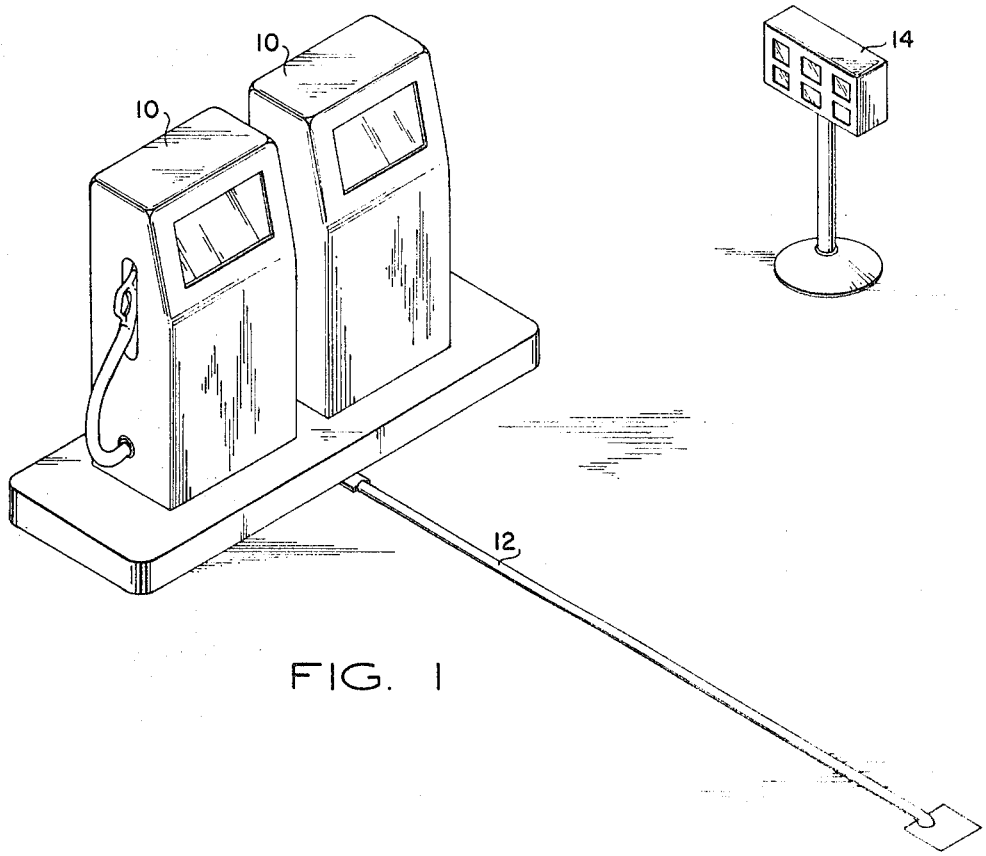
FIG. 1 is a perspective view illustrating the present invention as applied to a service station.
Figure 2:
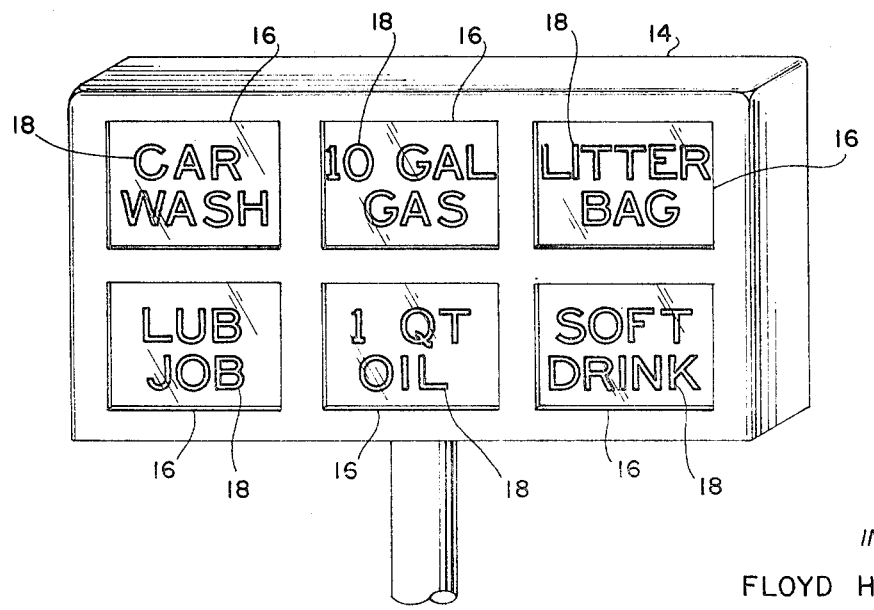
FIG. 2 is a perspective view of the display unit.

Turning now to the drawings, there is shown in FIG. 1 a pair of filling station pumps 10. Associated with the pumps is a hose 12 which extends across the driveway. Such hoses are conventionally used in the driveways of service stations for ringing bells when a customer drives onto the premises in a position for receiving gas. The display unit 14 is positioned relative to the gas pumps such that it can readily be viewed by a customer. As best seen in FIG. 2, the display unit has positioned on its face a plurality of panels 16 each of which has indicia 18 thereon for indicating various services or products. In the specific example shown, six such panels are provided. However, any desired number of panels can be provided. The panels 16 are suitably of translucent material. Each has an associated light bulb positioned to light the panel and display the product or service depicted thereon. It will be appreciated that the indicia can take the form of alphanumeric characters or can be a pictorial representation of the service or product.

Figure 3:
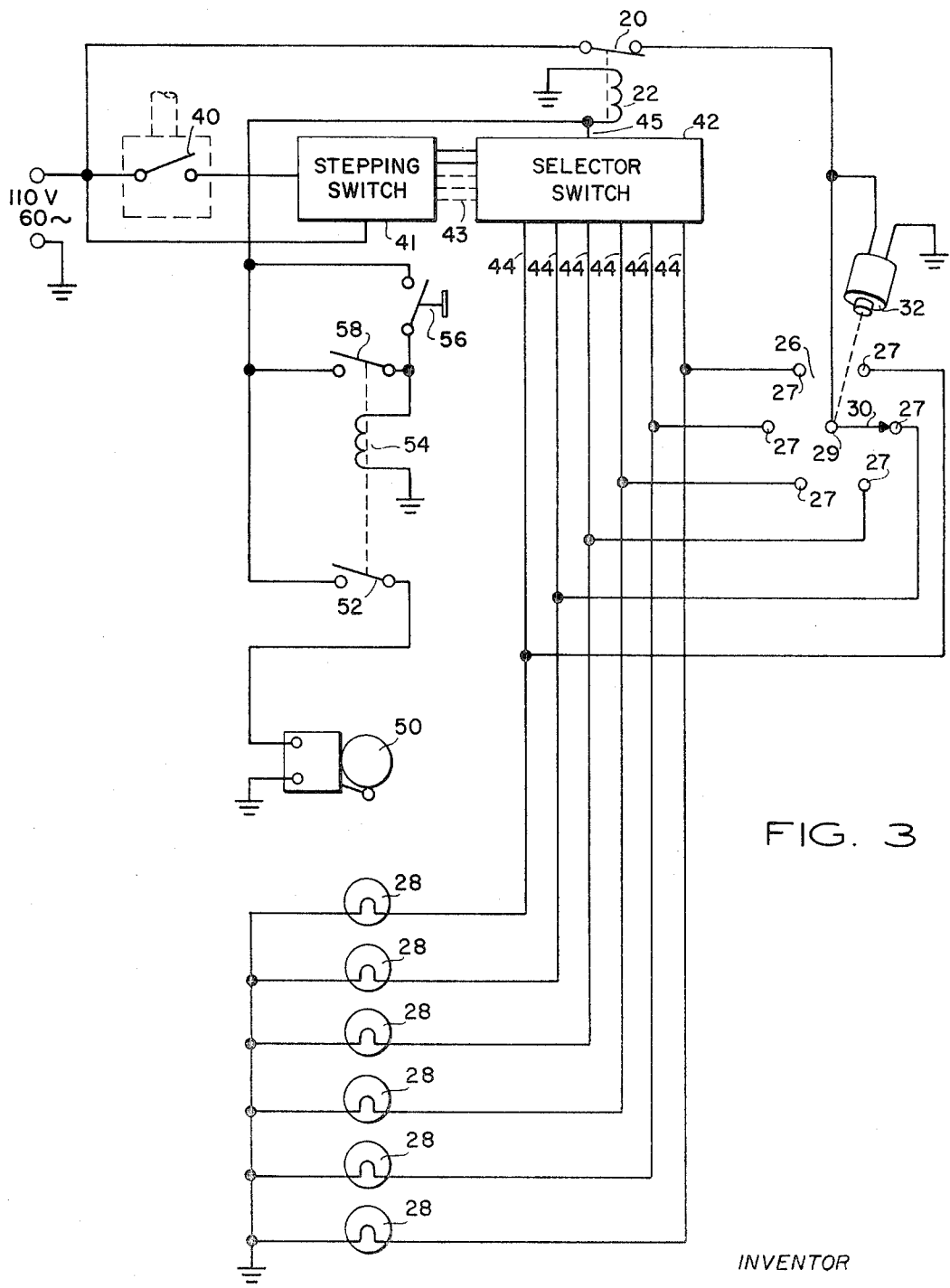
FIG. 3 is a schematic diagram illustrating the control circuitry of the present invention.

The control circuit is shown in greater detail in FIG. 3 of the drawings. It can be seen that the control circuit receives power from a suitable source, suitably the alternating current supply voltage present at all such service stations. The source of supply voltage is connected through the contact 20 of a relay 22 to the armature 24 of a rotary switch 26. The rotary switch 26 has a number of contacts 27 equal to the number of lamps 28 associated with panels 16. The contacts 27 are sequentially engaged by the armature wiper 30 as it is driven by the motor 32. The motor 32 receives power from the supply voltage through contact 20 and drives the rotary switch 26 so long as contact 20 is closed. When contact 20 is closed, power will also be applied sequentially to each of the contacts 27 as the motor drives the wiper 30. Each of the contacts 27 of the switch 26 is connected to one side of a respective one of lamps 28 positioned behind the panels 16. Accordingly, when contact 20 of relay 22 is closed the lamps 28 will be lit sequentially and the panels 16 will flash in a selected pattern depending upon the manner in which the associated lamps are connected to the rotary switch.

The supply voltage is also connected through switch 40 and a stepping switch 41 to a selector switch 42. The stepping switch 41 can be of any suitable type well known in the art, such as relay operated switches which will advance one position each time the switch 40 is operated, responsive to the wheels of a car passing over the hose 12. The selector switch is preferably of the type disclosed in US. Pat. No. 3,205,319. Inputs are applied to the selector switch from each contact of the stepping switch which it may be desired to signal winning of a prize through a plurality of leads 43. It includes a number of outputs 44 equal to the number of lamps in the display unit.

Contacts in the selector switch are positioned to connect one of the outputs 44 of switch 42 to receive power when the stepping switch 41 is operated predetermined numbers of times. For example, the selector switch 42 could be set such that on the 10th, 30th, 70th, 90th, 110th, 130th, 170th and 190th operations of the switch 40, the panel 16 having the litter bag thereof would be energized to indicate that the person operating the switch 40 had won a litter bag. On the 20th, 40th, 60th, 120th, 140th, 160th and 180th operations of the switch, the panel 16 having the indicia of a soft drink would be energized to indicate that a soft drink was won. On the 50th and 150th operations of the switch 40, a panel indicating one quart of oil could be energized indicating that a quart of oil was won. On the 100th operation of the switch 40, the panel indicating a car wash could be energized and on the 200th operation, the panel indicating a lube job could be energized. Thereafter, the sequence could commence again.

The frequency at which any prize is awarded can be established by the selector switch 42 to award prizes at a desired rate with due consideration to the value of the prize. Further, it is possible to stagger the sequence to, for example, award prizes to consecutive customers and then have a longer interval between the award prizes. An important advantage obtained by use of the selector switch is that by using a template for setting the selector switch, unskilled personnel can set the switch without knowing the interval between prizes. Such a capability is especially important when the prizes are changed by changing the panels on the display unit.

The relay 22 will be energized through conductor 45 at all times that the selector switch provides power to energize one of the lamps 28. When relay 22 is energized, the contact 20 will become open and the flashing of the lamps will cease as power no longer will be applied to armature 24 of switch 26. Accordingly, only the panel indicating the prize to be awarded will be energized until the switch 40 again is operated to advance the selector switch.

There is also preferably provided a bell 50 for providing an audible alarm indication when a prize has been won. The bell 50 suitably receives power from the same conductor 45 which energizes relay 22 through a circuit including the contact 52 of relay 54. It will be noted that the contact 52 is normally closed. The coil of relay 54 is connected through the normally open switch 56 to the line supplying power to the bell 50. It can therefore be seen that when one of the lines 44 receives power that the power will also be applied to energize the coil of relay 22 and the bell will be operated through normally closed contact 52. When the acknowledge switch 56 is momentarily depressed, the coil of relay 54 will be energized causing the contact 52 to open and breaking the circuit applying power to the bell 50. Contact 58 associated with the relay 54 will close maintaining the relay 54 energized. When the switch 40 is next operated, the selector switch 42 would advance one step removing power from conductor 45 and the line 44 receiving power. Relay 22 and relay 54 will become deenergized. Contact 20 will close permitting the flashing operation to commence again. Contact 58 will open and 52 will close placing the audible system in condition for operation when power is again applied to one of the outputs 44. It will be noted that the conductor 45 could be connected to the bell through a manually operated switch which would be opened to shut off the bell and closed after the stepping switch advanced one step.

It can be seen from the foregoing, that the display device of the present invention is relatively uncomplicated and, accordingly, is not expensive. Further, the system is compatible with existing alarm systems installed in most service stations. The prizes to be awarded and their value can be readily changed by replacing the panels on the face of the display device. The frequency at which prizes are awarded can be varied in conjunction with the change in the value of the prizes to maintain a desired frequency of distribution and cost. The cost of the advertising program can thereby be controlled to the extent necessary. Most importantly, the cost of the advertising program to a particular retailer is spent on prizes which go directly to customers at the station. Much better overall results of the advertising program are therefore obtained.

Although the invention as been described in reference to a particular preferred embodiment thereof, many changes and modifications will become apparent to those skilled in the art in view of the foregoing description which is intended to be illustrative and not limiting of the invention defined in the appended claims.

What I claim is:

1. An advertising display device comprising:
a. A display unit having a plurality of panels,
b. Indicia on each of said panels for indicating a selected product or service when said panel is energized,
c. Alarm means responsive to the presence of a prospective customer, and
d. Control means responsive to operation of said alarm means for energizing said panels in a selectable sequence as a function of the number of operations of said alarm means.

2. An advertising display device as defined in claim 1 further including flasher means for energizing said panels in a selected pattern.

3. A display device as defined in claim 1 wherein said alarm means includes an elongated hose disposed in the path of a prospective customer and a pressure switch connected to said hose for closure by pressure from the hose when a prospective customer passes over said hose.

4. A display device as defined in claim 2 wherein said flasher device comprises a multiple contact switch connected for sequentially applying power to energize said panels and means for driving said switch at a constant rate.

5. An advertising display device as defined in claim 2 further including means for preventing energization of said panels by said flasher means when said panels are energized by said control means.

6. An advertising display device as defined in claim 1 further including audible alarm means energized when one of said panels is energized by said control means.

7. An advertising display device as defined in claim 6 further including means for deactuating said audible alarm means while maintaining said selected panel energized.

8. An advertising display device as defined in claim 1 wherein said control means comprises a stepping switch and means for advancing said stepping switch responsive to operation of said alarm means.

9. A display device as defined in claim 1 wherein said panels are formed of translucent material having indicia thereon, each of said panels being replacable in order to change the product or service displayed on said device.

10. A display device as defined in claim 1 wherein said display unit comprises an enclosure having said panels on the front thereof, electric lamps positioned within said enclosure behind each of said panels for energizing said panels and a stand for supporting said enclosure above the driveway of a service station.

11. A display unit as defined in claim 8 wherein said central unit further includes a selector switch for selectively connecting outputs of said stepping switch to energize said panels.